W. L. BAYLEY & F. B. WILSON.
MACHINE FOR BIFURCATING SPIKES AND FOR PUNCHING SLOT HOLES IN BOLTS AND THE LIKE.
APPLICATION FILED MAY 8, 1917.
1,244,017.
Patented Oct. 23, 1917.
3 SHEETS—SHEET 1.
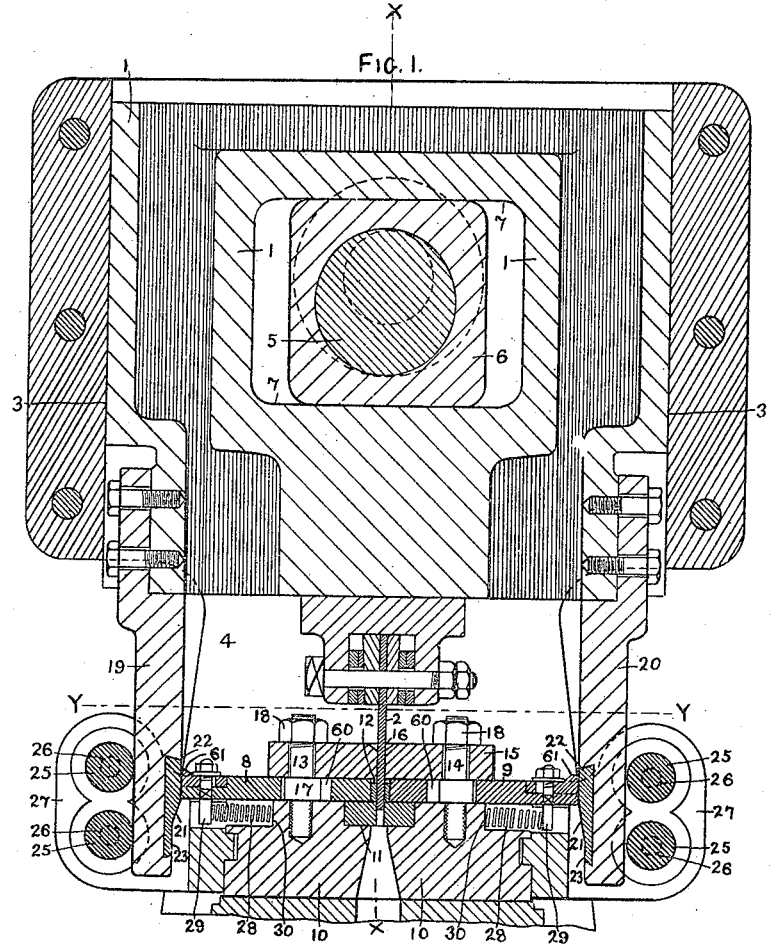
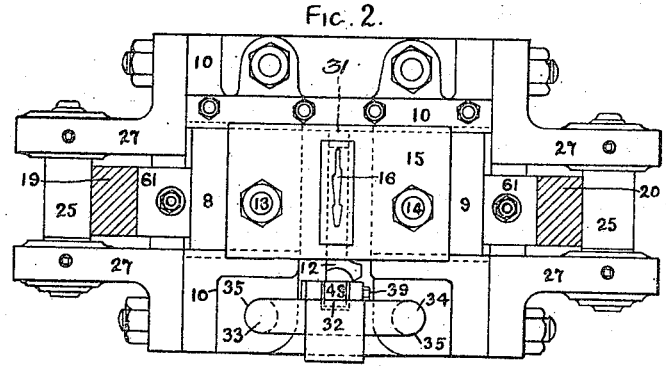
INVENTORS:
William Lloyd Bayley
Frank Baxter Wilson
By Wm Wallace White
ATT'Y.

W. L. BAYLEY & F. B. WILSON.
MACHINE FOR BIFURCATING SPIKES AND FOR PUNCHING SLOT HOLES IN BOLTS AND THE LIKE.
APPLICATION FILED MAY 8, 1917.
1,244,017.
Patented Oct. 23, 1917.
3 SHEETS—SHEET 2.
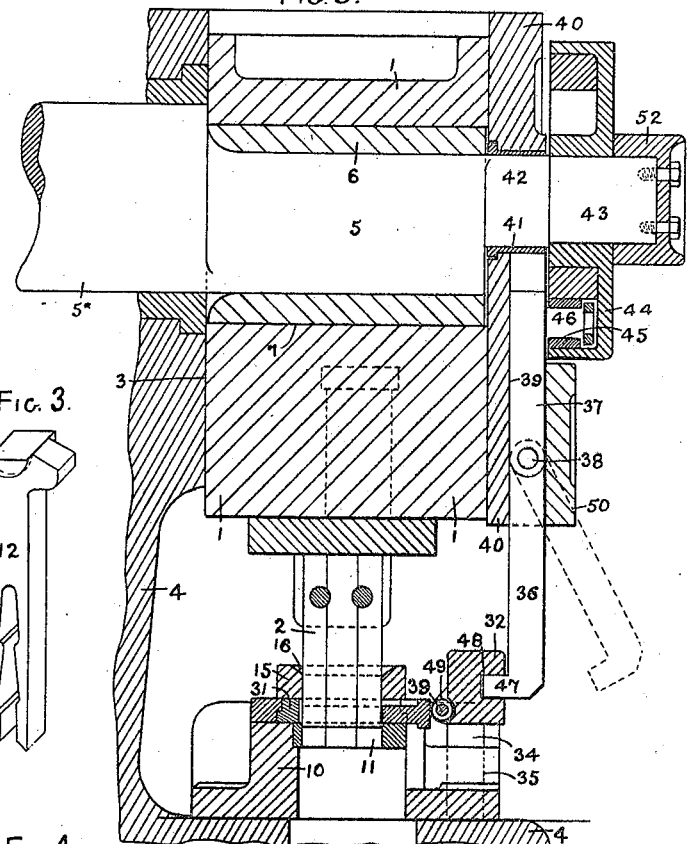
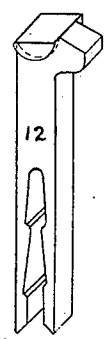
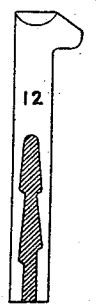
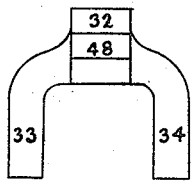
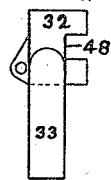
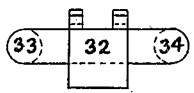

W. L. BAYLEY & F. B. WILSON.
MACHINE FOR BIFURCATING SPIKES AND FOR PUNCHING SLOT HOLES IN BOLTS AND THE LIKE.
APPLICATION FILED MAY 8, 1917.

1,244,017.

Patented Oct. 23, 1917.
3 SHEETS—SHEET 3.

INVENTORS:
William Lloyd Bayley
Frank Baxter Wilson
By Wm Wallace White ATT'Y.

UNITED STATES PATENT OFFICE.

WILLIAM LLOYD BAYLEY, OF DARLASTON, AND FRANK BAXTER WILSON, OF WILLENHALL, ENGLAND.

MACHINE FOR BIFURCATING SPIKES AND FOR PUNCHING SLOT-HOLES IN BOLTS AND THE LIKE.

1,244,017. Specification of Letters Patent. Patented Oct. 23, 1917.

Application filed May 8, 1917. Serial No. 167,226.

*To all whom it may concern:*

Be it known that we, WILLIAM LLOYD BAYLEY and FRANK BAXTER WILSON, residing, respectively, at 69 Walsall road, Darlaston, England, and at 60 Walsall road, Willenhall, England, subjects of His Majesty the King of Great Britain and Ireland, have invented certain new and useful Improvements in and Connected with Machines for Bifurcating Spikes and for Punching Slot-Holes in Bolts and the like, of which the following is a specification.

This invention has reference to machines for bifurcating spikes and for punching slot holes in bolts and the like.

The said bifurcated spikes are formed by punching a piece longitudinally out of the shank for a certain distance up from its end thereby dividing that portion of the shank into two legs the inner surfaces of which are sometimes smooth and sometimes formed with rabbeted inclines so as to afford a better grip in the wood into which the spike is driven.

Our invention comprises improvements in the means for holding and supporting the spike bolt or the like during the bifurcating or punching process.

According to this invention any lateral displacement of the spike or bolt, while the punch is passing through the same, is prevented by a pair of horizontal gripping slides which are arranged immediately under the stripping plate and on the top of the bottom die and are operated by inclined parts carried by the main slide so as to close toward one another on to the spike or bolt and grip the same sufficiently to cause it to maintain its central position under the punch while the latter descends to bifurcate the spike or to punch a cotter hole in the bolt or the like. In combination with these gripping slides we provide a moving end stop member which moves down in front of and in contact with the head of the spike or bolt just before the punch commences to act, thereby, with the fixed stop at the other end of the spike or bolt, preventing any endwise movement of the same during the bifurcating or punching process.

Our said invention also comprises means combined with the main slide and its side bars for the purpose of tending to arrest the main slide at the top of its stroke and to keep the slide in that position, if so desired, after the punch has bifurcated or punched the spike or bolt, so as to enable the spike or bolt to be withdrawn from the gripping slides while the main slide is at the top of its stroke and another spike or bolt placed in position on the bottom die ready for bifurcating or punching.

The accompanying drawings illustrate the preferred arrangement of carrying our said invention into practice.

Of these drawings Figure 1 is a sectional front elevation and Fig. 2, is a part sectional plan taken on the line Y—Y of Fig. 1, of portions of a well known type of punching press with our invention applied thereto and arranged for punching or bifurcating spikes of the kind shown in Fig. 3 by punching a central piece out of the shank of the same such as shown by the shaded portion of Fig. 4;

Fig. 5 is a sectional side elevation taken on line X—X of Fig. 1;

Fig. 6 is a front elevation of the forked guide part of the mechanism shown in Fig. 2; Fig. 7 is a side elevation and Fig. 8 is a plan of the same;

Figure 9:
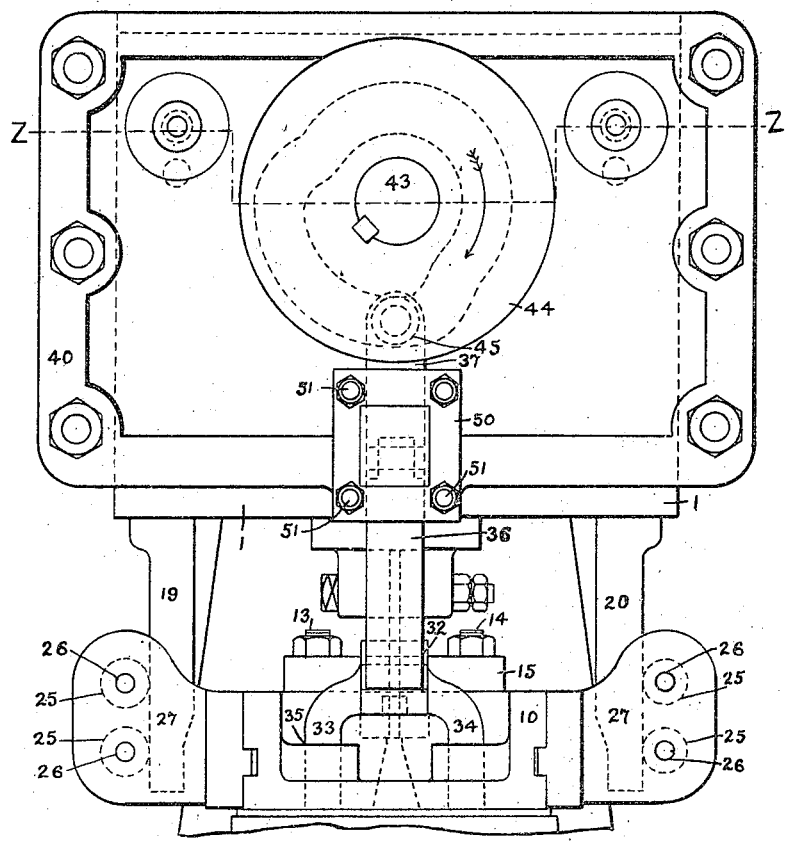
Fig. 9 is a front elevation of the mechanism shown in Figs. 1, 2 and 5.

In the preferred arrangement of carrying our invention into practice we employ a punching press of the well known type which is used for punching and shearing and has a main slide 1 carrying the punch 2 and working vertically up and down in suitable guides 3 of the machine frame 4 and operated by a crank pin 5 in a sleeve 6 working in a horizontal slot 7 of the main slide 1. 8 and 9 are the two horizontal gripping slides which are arranged to slide horizontally in cross guide grooves of the fixed table 10 which carries the perforated bottom die 11 on which is placed the spike or bolt 12 which is to be bifurcated or punched. Immediately above these horizontal gripping slides and fixed to the machine table 10 as by the two up-standing studs 13, 14, is the stripping plate 15 which is perforated at 16 to allow the punch 2 to pass through it. The thickness of the gripping slides 8, 9, is slightly greater than the diameter or thickness of the spike or bolt 12 see Figs. 1 and 5 so as to allow clearance between the underside of the stripping plate and the top of the spike or bolt. The studs 13, 14, which are screwed into the machine table 10, are formed with collars 17 just enough thicker than the thickness of the gripping slides 8, 9, to permit the slides to freely slide to and fro below the stripping plate 15 fixed by the nuts 18 on the collars; these relative thicknesses, for purposes of clarity, not being shown in the drawings. The gripping slides 8, 9, are slotted at 60 to clear the collars 17. Fixed to the sides of the main slide 1 are two downwardly projecting bars 19, 20 made with wearing faces which are inclined at 21 and flat at 22 and 23 above and below the inclined part 21 and these are arranged to act against wearing pieces 61 fixed on the outer ends of the gripping slides 8, 9, so as to force the gripping slides 8, 9, together at the proper time in the working of the machine as hereinafter described and to hold them closed against the sides of the spike or bolt while the punch passes therethrough and also to permit the gripping slides 8, 9, moving apart at the proper times to release the spike or bolt as hereinafter described.

In order to support the downwardly projecting bars 19, 20 against lateral or bending pressure, two bearing rollers 25 are provided for each downwardly projecting bar at the opposite sides of the same to the gripping slides 8, 9, these bearing rollers being adapted to turn in bearings 26 in side brackets 27 which are fixed to or formed with the machine table near the outer ends of the gripping slides 8, 9 (see Fig. 1). The gripping slides 8, 9, are forced outwardly against the acting faces of the downwardly projecting bars by compression springs 28 arranged in recesses in the machine table 10 and adapted to act between projections 29 fixed on the gripping slides and the solid ends 30 of the recesses in which the compression springs are situated.

The spike or bolt 12 to be bifurcated or punched is suitably heated and while the moving stop member hereinafter described is in its highest raised position the spike or bolt is inserted shank end first into the space between the bottom die 11 and the stripping plate 15 and between the adjacent ends of the gripping slides 8, 9, up to a suitable stop 31, and in order to maintain the spike or bolt 12 in this position against the stop 31 the moving stop member above referred to is provided. This moving stop member preferably consists of a block 32 formed with and carried by a forked guide piece made with two downwardly projecting legs 33, 34, arranged at a convenient distance apart and parallel with one another and adapted to move up and down in guide holes 35 in the machine table 10. The object of the guide being forked as aforesaid is to permit of the spikes or bolts 12 being fed one at a time or withdrawn under the block 32 between the two legs 33, 34. The said moving stop member is preferably furnished with a roller 49 mounted on a horizontal pin 39 and adapted to act against the end of the head of the spike or bolt 12 and to remain in that position (see Fig. 5) during the bifurcating or punching process. The moving stop member 32, 33, 34 is caused to move up and down the guide holes 35 by being connected to a cam slide bar preferably made in two parts 36, 37 which are jointed together at 38 and are adapted to move up and down in a vertical guide or groove 39 formed in the front plate 40 which is fixed to the front of the machine frame in front of the main slide 1 and is furnished with an outer bearing 41 for the reduced part 42 of the crank shaft 5$^x$ which is continued at 43 beyond the bearing 41 and on this outer end portion 42 of the crank shaft there is provided a grooved face cam 44 in the groove of which engages a roller 45 adapted to revolve on a pin 46 formed on the upper end of the upper part 37 of the cam slide bar. The lower end of the cam slide bar is made with a forward projection 47 which engages with a recess 48 in the block 32 of the movable stop member as in Fig. 5. This cam 44 is so shaped and timed that just before the punch 2 is commencing its work the cam 44 forces the moving stop member downwardly and causes the roller 49 carried thereby to bear against the end of the head of the spike or bolt 12 and thus as aforesaid prevent any longitudinal expansion of the spike or bolt 12 during the process of bifurcating or punching. At the termination of this process, just before the punch 2 commences to move upwardly the moving stop member 32, 33, 34 with its roller 49 is raised clear of the head of the spike or bolt to permit of the expansion of the same as the punch rises as aforesaid. 50 is a small cover plate which is provided over the vertical slot 39 in the large front plate 40 and is secured thereto as by bolts 51 so that by first removing this small cover plate 50 the lower portion 36 of the cam slide bar can be turned outwardly as shown by the dotted lines in Fig. 5 clear of the movable stop member so as to enable the latter to be raised out of the guide holes 35 and removed when required. The whole of the cam slide bar 36, 37 can readily be removed when required by first removing the cap 52 from the end portion 43 of the crank shaft and then sliding the cam 44 backwardly until its groove is clear of the cam roller 45.

Figure 10:
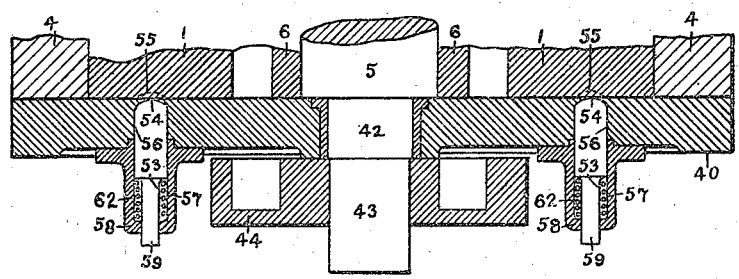
Fig. 10 is a sectional plan taken on line Z—Z of Fig. 9.

In order to tend to arrest the main slide 1 after the main driving clutch of the crank shaft has been thrown out of gear, we provide on the front cover 40 one, two, or more preferably two, friction plungers 53 (see Fig. 10) made with rounded or other shaped nose ends 54 as may be suitably adapted to engage in depressions 55 in the front face of the main slide 1 when the latter is at the top of its stroke thus tending to arrest the main slide in that position when the main driving clutch on the crank shaft has been thrown out. Each of these spring plungers can conveniently consist of a round part 53 working transversely in a cross hole 56 in the slide cover 40 and continuously pressed against the face of the main slide 1 by means of a concealed coiled wire spring 62 which acts between the shoulder 57 of the plunger and the inside of the outer end of the tubular casing or guide 58 which is fixed to the front of the main slide cover and in which the plunger works, said plunger having a tail end 59 of reduced diameter which projects through the front of the guide or casing 58.

Our said invention is applied to presses for punching cotter holes in bolts and the like similarly as above described and illustrated as applied to a press for bifurcating or punching spikes.

The accompanying drawings illustrate what we consider to be the best way of carrying our said invention into practice but it is to be understood that our invention is not limited to the precise details shown as it will be evident that these may be varied to some extent without departing from the nature of our invention as defined by the appended claims.

What we claim as our invention and desire to secure by Letters Patent is:—

1. In a machine for punching bolts or the like, the combination of a main slide, a punch carried thereby, a bottom die, a stripping plate, two gripping slides arranged under the stripping plate and immediately over the bottom die and movable to grip and support the sides of the spike or bolt in position under the punch and to release the spike or bolt when punched, means for guiding said gripping slides, two bars operatively connected to the main slide and the gripping slides to operate the gripping slides in timed relation to the main slide, and means for supporting the ends of the spike or bolt during the punching operation, substantially as set forth.

2. In a machine for punching bolts or the like the combination of a main slide, a punch carried thereby, a crankshaft, a sleeve on the shaft, the punch having a slot in which the sleeve works, a cam on the shaft, a forked slide operated by a connection from said cam, means for guiding said forked slide, said forked slide carrying a roller adapted to move down against the end of the spike or bolt and prevent endwise expansion of the same during the punching process and also to rise clear of the spike or bolt after the same has been punched substantially as set forth.

In testimony whereof we affix our signatures in presence of two witnesses.

WILLIAM LLOYD BAYLEY.
FRANK BAXTER WILSON.

Witnesses:
CHARLES BOSWORTH KETLEY,
BERTHA MATILDA DEELEY.

Copies of this patent may be obtained for five cents each, by addressing the "Commissioner of Patents, Washington, D. C."